United States Patent [19]

Fujii et al.

[11] Patent Number: 5,053,789
[45] Date of Patent: Oct. 1, 1991

[54] OPTICALLY-SWITCHED THERMAL PRINTHEAD SYSTEM

[75] Inventors: Kenichi Fujii, Osaka; Hisashi Uemura, Nishinomiya, both of Japan

[73] Assignee: Kanzaki Paper Manufacturing Co. Ltd., Tokyo, Japan

[21] Appl. No.: 622,721

[22] Filed: Dec. 5, 1990

[30] Foreign Application Priority Data

Aug. 12, 1989 [JP] Japan .................................. 319130

[51] Int. Cl.$^5$ ...................... G01D 15/10; G03G 5/16
[52] U.S. Cl. .................... 346/76 PH; 346/33 A; 346/76 L; 250/208.4; 250/316.1
[58] Field of Search ............ 346/33 A, 76 L, 76 PH; 250/208.4, 316.1

[56] References Cited

U.S. PATENT DOCUMENTS 4,481,510 11/1984 Hareng et al. ............... 250/208.4 X
4,520,370 5/1985 Fujii et al. ......................... 346/76 L
4,959,663 9/1990 Chiba et al. .................... 346/76 PH Primary Examiner—Benjamin R. Fuller
Assistant Examiner—Gerald E. Preston
Attorney, Agent, or Firm—Morgan & Finnegan

[57] ABSTRACT

A scanning mode printer operates with an array of heating elements and corresponding photoelectric elements coupled in parallel so that a modulated laser beam scans in line fashion the photoelectric elements to respectively activate each heating element in a thermal head for imaging a heat-responsive medium.

1 Claim, 1 Drawing Sheet

OPTICALLY-SWITCHED THERMAL PRINTHEAD SYSTEM

TECHNICAL FIELD

The present invention relates to a scanning type laser printer using no toner.

Conventional laser printers employ the electrostatic recording system as the printing means.

However, the use of the electrostatic recording system requires resupply of toner and also requires many auxiliary devices including a charging device and heating and fixing device; thus, the amount of routine maintenance operation is high. Further, a blur inevitably occurs around the peripheral portion of an image owing to aberration in the optical system.

DISCLOSURE OF THE INVENTION

The present invention is intended to realize a laser printer not using the electrostatic recording system to thereby eliminate the aforesaid problem of maintenance and blur around the peripheral portion of an image.

The optical recording apparatus according to the invention comprises a plurality of units each including a series combination of a heating element and a photoelectric swith. The plurality of units are arranged in a row to form a thermal head, and the row of said photoelectric switches on said thermal head is scanned by laser scanning means.

ADVANTAGES

A usual thermal printer using a thermal head comprises a series combination of a heating element and switch means which forms a recording unit of picture element, such units being arranged to form a thermal head, and printing signals are imparted to said switch means to control the electric current passing through each heating element.

The present invention is based on the principle of using photoelectric switch means serving as the switch means for each heating element, and producing printing signals in the form of light. Since the optical system and signal processing system of the laser printer are used to apply printing signals in the form of light, the function is the same as in the laser printer and the recording system is the same as in the thermal printer. This printer does not require any toner and hence dispenses with the auxiliary devices such as charging device and fixing device; thus, the amount of maintenance is less than in the conventional electrostatic type. Further, in the laser printer, the beam diameter is large in the peripheral portion of an image owing to aberration, producing a blur in a reproduced image. In the present invention, however, a laser beam is the exclusive means for inputting printing signals, and the beam diameter does not appear directly on the recording surface. And even in the peripheral portion of the image, the size of the picture element depends on the size of the heating element, and the blur in the peripheral portion due to aberration in the optical system is decreased. That is, it is a very important feature that there is no need to make the density of the optical detecting section equal to the density of the heating element.

The printer system of the present invention is superior to the usual thermal printer in that the advantages of the laser printer can be used as such. These advantages are as follows.

(i) Reverse characters and the like can be easily formed by chopper control;

(ii) The printing rate can be easily controlled by synchronism with the mirror rotating speed;

(iii) Preliminary obtainment of data corresponding in amount to one or more pages can be easily attained by effecting beam scan in advance (it is premised that a buffer memory has been provided). Further, a multi-line head can be easily realized by beam scan control (raster scan) or the like.

(Embodiments)

Figure 1:
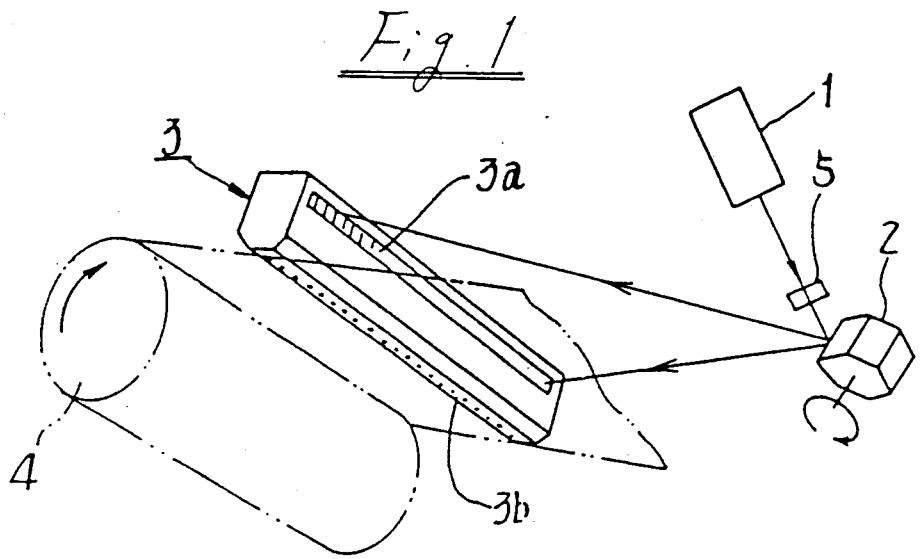
FIG. 1 is a perspective view showing an embodiment of a laser scanning type printer according to the invention.
Figure 2:
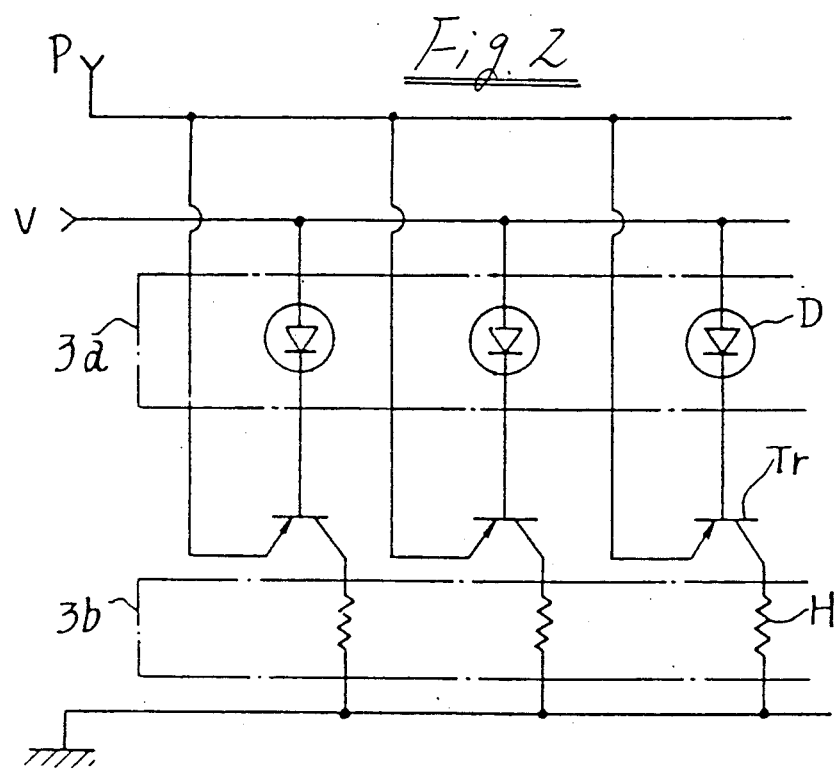
FIG. 2 is an electric circuit diagram for a printer head in said embodiment.

FIG. 1 shows an embodiment of the invention. In the figure, the numeral 1 denotes light source in the form of a laser adapted to emit a laser beam modulated by recording information; 2 denotes a rotary polygonal mirror for scanning; and 3 denotes a print head according to the invention. In the print head 3, the character 3a denotes a light-receiving surface constructed by a number of light-receiving elements $D_1$, $D_2$. $D_3$. . . , $D_n$ arranged along a line, and 3b denotes a print output surface constructed by a number of heating elements $H_1$, $H_2$, . . . $H_n$ arranged in a row. The laser beam from the light source 1 scans said light-receiving surface. The numeral 5 denotes a chopper which operates in synchronism with the polygonal mirror 2. When that heating element which corresponds to the light-receiving element irradiated with the light during this scanning is energized, a picture element is printed at a point on a recording paper sheet 4 which is in contact with this heating element. Therefore, if the light-receiving surface 3a of the printing head is scanned by the laser beam modulated in accordance with a record pattern, the latter will be printed or reproduced on the recording paper sheet. FIG. 2 shows the electric circuit arrangement of said printing head. The heating elements generally denoted by H are resistor heaters, connected to a heater power source P through respective switching transistors Tr. The light-receiving elements generally denoted by D are photodiodes arranged in array form, constituting said light-receiving surface 3a. The photodiodes D are connected at one of the respective terminals thereof to the bases of the associated transistors Tr and at the other terminals to a photodiode power supply V. If one photodiode D is irradiated with light, the transistor Tr connected to said diode is rendered conductive, energizing the heater H connected to the collector of said transistor; thus, one picture element is recorded.

Figure 3:
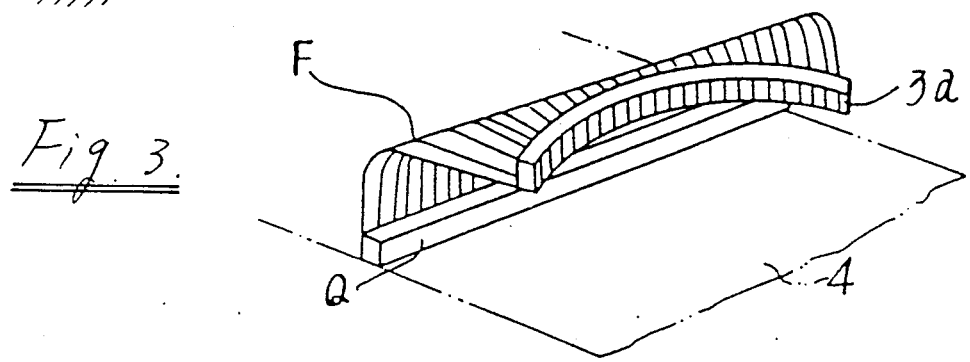
FIG. 3 is a perspective view showing another embodiment of the invention.

In the embodiment shown in FIG. 1, the record output surface 3b having the arranged heaters H is integral and parallel with the light-receiving surface having the arranged light-receiving elements D. However, the electrical connection between the photodiodes D and the transistors Tr may be made by using a flexible printed board, in which case the light-receiving surface and the record output surface can be easily changed from the straight parallel arrangement to a different arrangement. For example, the pitch of the light-receiving elements may be shorter than that of the heaters so as to make the scanning optical system structurally smaller. FIG. 3 shows an example in which the light-receiving surface 3a' is curved, Q designating a heating head and F designating a flexible printed board which connects the two. Since the light-receiving surface is curved in an arc with the center located at the center for the twist angle of the scanning beam, the influence of the aberration in the scanning optical system can be greatly decreased.

According to the present invention, since the present printer is a laser printer and uses no toner, it is very advantageous in terms of maintenance, and even if the scanning beam spreads in the end of an image, such spread will not be directly reproduced in the image, but the on-off control function of the electric circuit allows it to be represented as the size of a single heating element per one signal bit; therefore, the influence of aberration is reduced. Further, the shape of the light-receiving surface of each light-receiving element has not to be the same as the shape of a picture element and can be an elongated shape. Therefore, unlike the case of the electrostatic recording system, the scanning beam does not have to be converged to a point but it may be linearly converged; thus, the construction of the scanning optical system is facilitated. Further, since the row of heaters has not to be united with the row of light-receiving elements, the flexibility of desposition of the scanning optical system is increased, making it possible to construct the entire printer in compact form.

What is claimed is:

1. A scanning type printer comprising:
    a printer head circuit having a number of circuit branches connected in parallel between terminals of a power supply, each of said branches being composed of a heating element and a photoelectric element, so that energization of said heating element being switched by controlling irradiation of said photoelectric element with light,
    a thermal print head physically fixing and supporting said print head circuit, the photoelectric element in the respective branches being arranged along a predetermined beam scanning line and the heating element being arranged in a predetermined plane in the same order as said order of arrangement of the corresponding photoelectric element, and
    a scanning optical system for emitting a modulated laser beam to be scanned to form said light beam scanning line.

* * * * *